(12) United States Patent
Jensen

(10) Patent No.: US 12,378,795 B2
(45) Date of Patent: Aug. 5, 2025

(54) LOCKING DEVICE WITH A CATCH ARRANGEMENT

(71) Applicant: STENDALS EL AB, Västerås (SE)

(72) Inventor: Lars Jensen, Surahammar (SE)

(73) Assignee: STENDALS EL AB, Västerås (SE)

( * ) Notice: Subject to any disclaimer, the term of this patent is extended or adjusted under 35 U.S.C. 154(b) by 37 days.

(21) Appl. No.: 18/036,296

(22) PCT Filed: Nov. 9, 2021

(86) PCT No.: PCT/SE2021/051120
§ 371 (c)(1),
(2) Date: May 10, 2023

(87) PCT Pub. No.: WO2022/103316
PCT Pub. Date: May 19, 2022

(65) Prior Publication Data
US 2023/0417077 A1 Dec. 28, 2023

(30) Foreign Application Priority Data
Nov. 12, 2020 (SE) .................... 2051323-0

(51) Int. Cl.
*E05B 15/00* (2006.01)
*E05B 17/04* (2006.01)
(Continued)

(52) U.S. Cl.
CPC ........ *E05B 15/0013* (2013.01); *E05B 17/042* (2013.01); *E05B 17/2038* (2013.01); *E05B 63/08* (2013.01)

(58) Field of Classification Search
CPC .... E05B 15/0013; E05B 17/04; E05B 17/042; E05B 17/20; E05B 17/203; E05B 17/2038; E05B 63/08
See application file for complete search history.

(56) References Cited

U.S. PATENT DOCUMENTS 6,138,485 A * 10/2000 Fuss .................... E05B 65/1086
70/277
6,324,876 B1 * 12/2001 Prevot .................... E05C 9/026
70/109
(Continued)

FOREIGN PATENT DOCUMENTS

DE 20220993 U1 10/2004
DE 202015101504 U1 6/2016
(Continued)

*Primary Examiner* — Christopher J Boswell
(74) *Attorney, Agent, or Firm* — Dilworth & Barrese, LLP.; Michael J. Musella, Esq.

(57) ABSTRACT

The present invention relates to a locking device comprising: —a locking bolt (12), —a follower arrangement (30) comprising a follower arm (32) configured to rotate about a first axis (B) and also comprising a follower (31) that is configured to rotate about the first axis (B) in response to an activation, —a catch arrangement (20) configured to block the follower arm (32) in a blocking state in order to prevent rotation of the follower arm (32), wherein the follower (31) of the follower arrangement (30) is operatively connected to the catch arrangement (20), wherein the blocking state corresponds to the catch arrangement (20) being in an end position of a movement path (P), and wherein the catch arrangement (20) is further configured to operate the follower arm (32) when not in the blocking state so that a movement of the catch arrangement (20) along the movement path (P) causes a corresponding movement of the follower arm (32).

18 Claims, 13 Drawing Sheets

Figure 1:
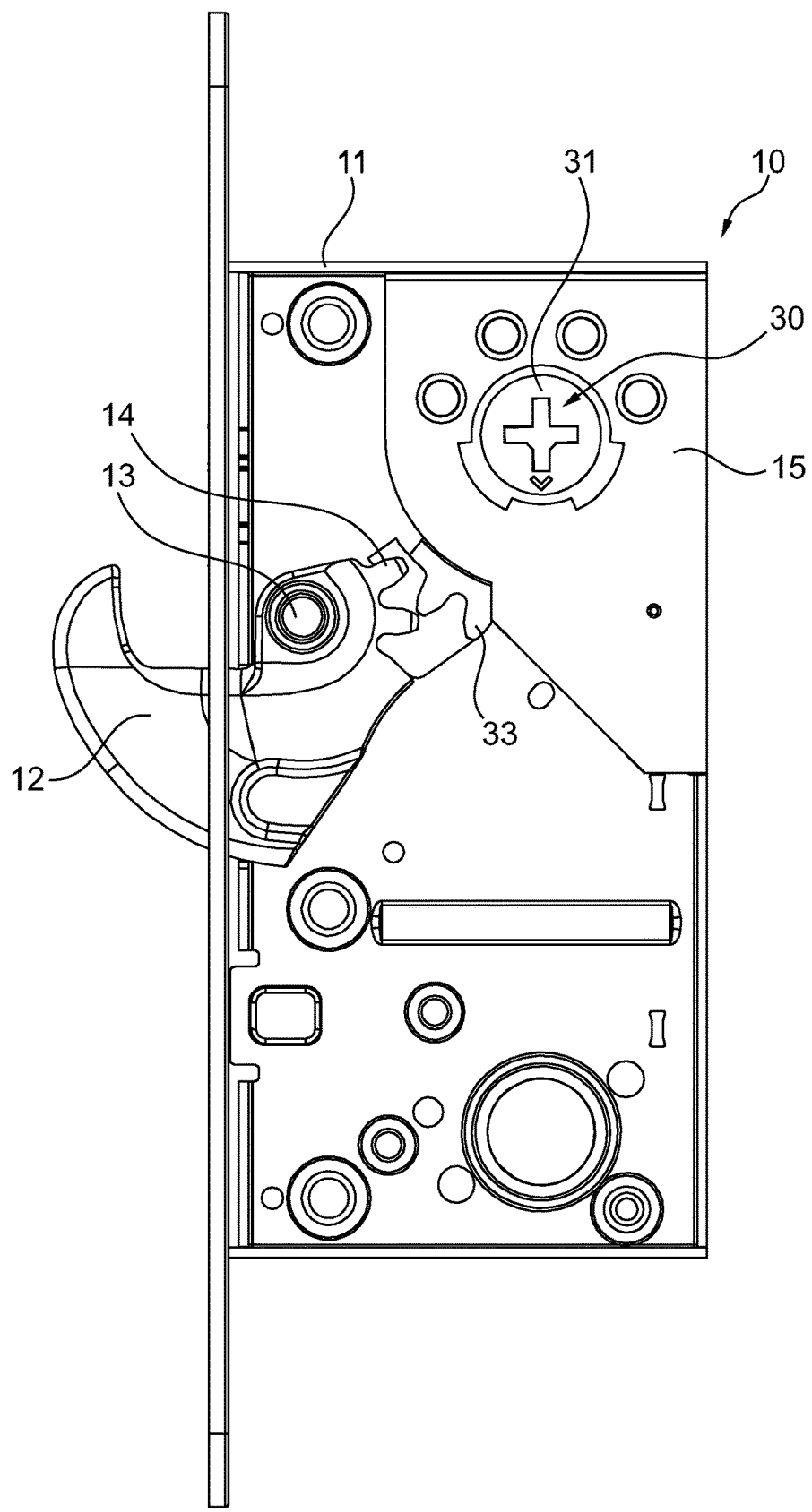

(51) Int. Cl.
    *E05B 17/20*    (2006.01)
    *E05B 63/08*    (2006.01)

(56)                References Cited

U.S. PATENT DOCUMENTS 8,641,104  B1 *   2/2014  Tien ........................ E05B 63/16
                                                                   292/244
    9,074,391  B2 *   7/2015  Van Parys ................ E05B 63/16
    9,890,565  B2 *   2/2018  Shiu ........................ E05B 63/08
 2003/0094023  A1     5/2003  Van Parys
 2006/0123859  A1 *   6/2006  Gonzalez ................. E05B 59/00
                                                                    70/107
 2014/0047878  A1     2/2014  Zheng et al.
 2022/0235580  A1 *   7/2022  Qin ..................... E05B 15/0013
 2023/0392413  A1 *  12/2023  Hiremath ............ E05B 15/0033

FOREIGN PATENT DOCUMENTS

EP           0482588  A1      4/1992
 EP           2378039  A2     10/2011
 EP           2397628  A2     12/2011
 EP           2987928  A1 *    2/2016   ......... E05B 17/0062
 EP           3543436  A2      9/2019
 WO        2005/054610  A1     6/2005
 WO        2020/117071  A1     6/2020

* cited by examiner

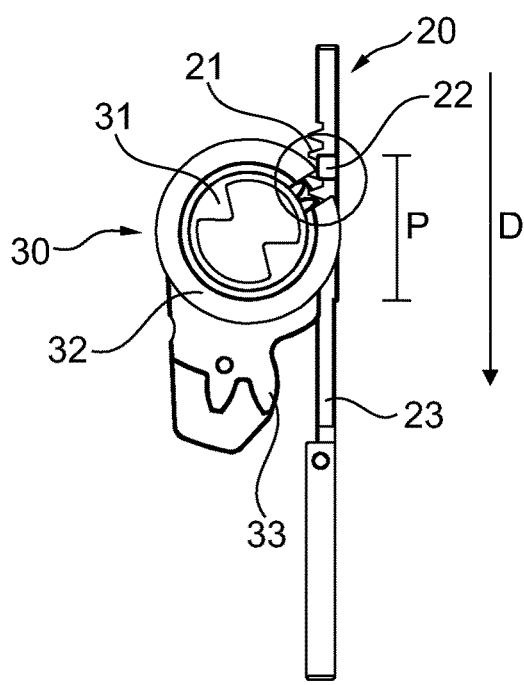
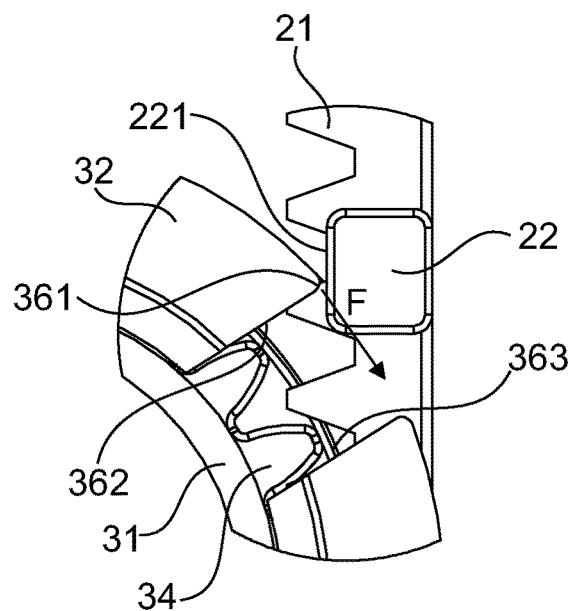
Fig. 6a
Fig. 6b
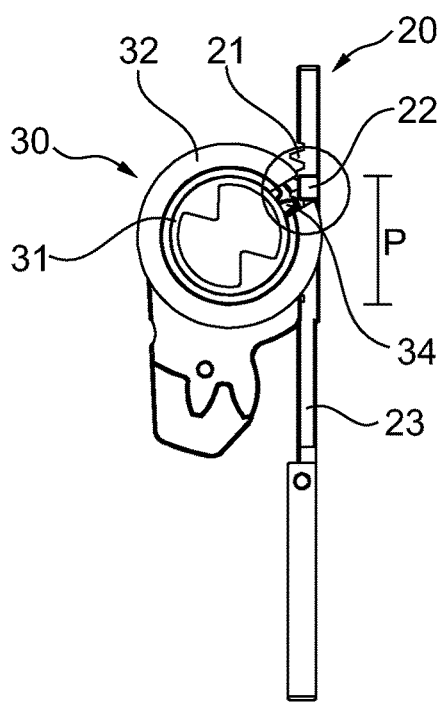
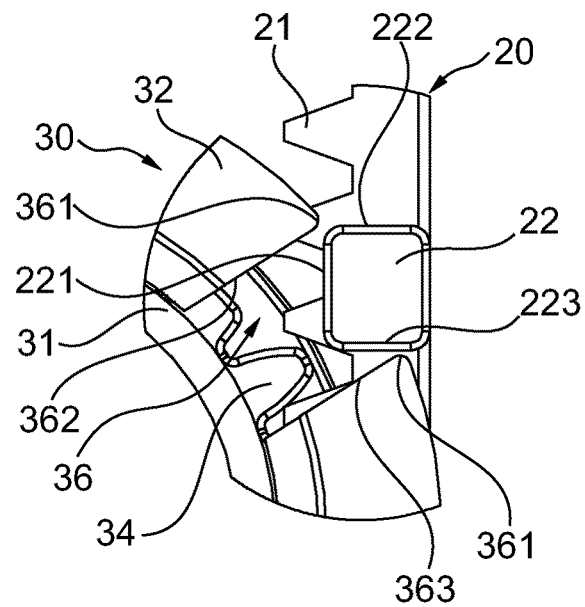
Fig. 6c
Fig. 6d

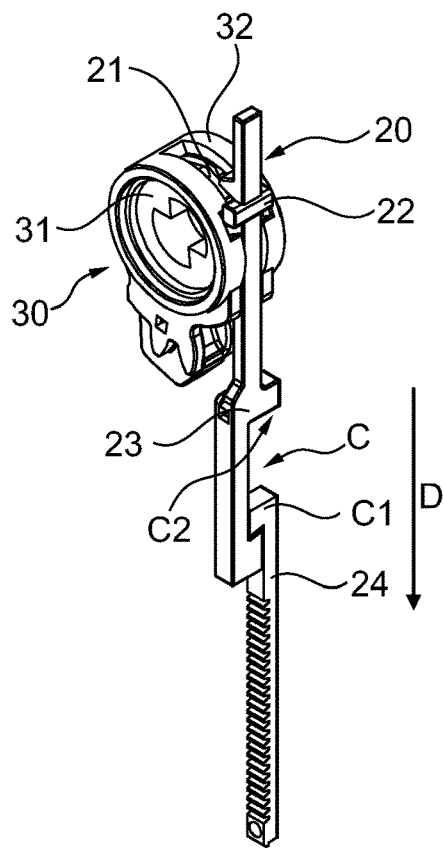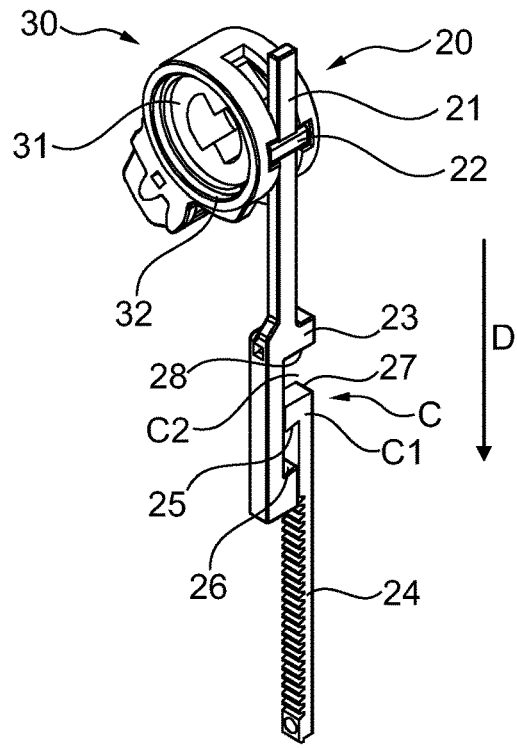
Fig. 7b    Fig. 7c
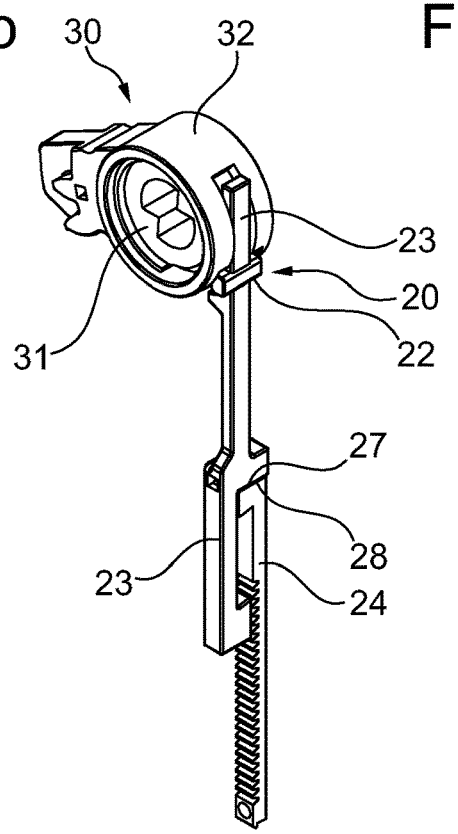
Fig. 7d

LOCKING DEVICE WITH A CATCH ARRANGEMENT

TECHNICAL FIELD

The present invention relates to a locking device with a catch arrangement for preventing movement of a locking bolt in a blocking state.

BACKGROUND

Within the field of locking devices, there is generally a need for achieving multiple functions in a severely limited space. At the same time, the requirements for robustness and security are high, so that the locking device must be able to function as intended but at the same time preventing manipulation or unauthorized operation of the locking device.

There are many possible solutions to these problems, but they generally suffer from drawbacks. In some locking devices, outside manipulation may take place due to insufficient protection of components of the locking device. There is also a general problem with using multiple components in the available space that often means that efficient and robust transfer of forces to operate the locking device is hindered. This is especially problematic in locking devices where the available space is even more limited than usual, due to the need in incorporate a plurality of functions and components in the locking device or due to the available space being very limited. One type of locking devices where this problem is especially known is narrow profile locks. Narrow profile locks are a category of locks that have a backset of 35 mm or less.

There is therefore a need for improvements in this area in order to provide a compact yet efficient locking device that prevents unauthorized access.

SUMMARY

The object of the present invention is to eliminate or at least to minimize the problems discussed above. This is achieved by a locking device according to the description herein.

The locking device according to the invention comprises a locking bolt having an extended position corresponding to a locked state and a retracted position corresponding to an unlocked state, and also comprises a follower arrangement having a follower arm configured to rotate about a first axis, the follower arm being operatively connected to the locking bolt for moving the locking bolt in response to a rotation of the follower arm, Further, the follower arrangement comprises a follower that is configured to rotate about the first axis in response to an activation. The locking device also comprises a catch arrangement configured to block the follower arm in a blocking state in order to prevent rotation of the follower arm, and the follower of the follower arrangement is operatively connected to the catch arrangement so that rotation of the follower causes a movement of the catch arrangement along a movement path. The blocking state corresponds to the catch arrangement being in an end position of the movement path, and the catch arrangement is further configured to operate the follower arm when not in the blocking state so that a movement of the catch arrangement along the movement path causes a corresponding movement of the follower arm.

The locking device of the invention thus provides a compact design with few components and with a catch arrangement that blocks the follower arm so that the locking bolt is unable to move when the catch arrangement is in the blocking state. Since the blocking state is reached when the catch arrangement is in the end position of the movement path and the movement along this path is controlled by the follower, it follows that by rotating the follower the desired operation of the locking bolt occurs and the locking device is then blocked once the operation is completed. Thus, when the activation that operates the follower has taken place so that the follower has been rotated, the locking device then reaches the blocked state where any attempts to manipulate the locking bolt by unauthorized means are efficiently prevented. The locking device is only able to move again when the catch arrangement starts moving along the movement path again so that the blocking state is abandoned, and this may only occur through activation of the locking device. In some embodiments, an additional second activation is provided and configured to operate the catch arrangement in order to operate the follower arm via the catch arrangement. Both these activations serve to operate the follower arm by means of the catch arrangement.

It is also highly advantageous that the follower arm and the follower rotate about the same axis, since this allows for a compact and efficient locking device so that the locking device may still provide space for other components to allow other functions to be built into the locking device. By using few components, the transmission of force is improved as compared with prior art solutions, and the risk of failure is decreased. Also, by using few components to achieve the functions described herein manufacturing costs are lower as compared with the prior art solutions. Alternatively, the compactness of the locking device makes it highly suitable for use within the field of narrow profile locks which has severe space constraints. Narrow profile locks are a category of locks that have a backset of 35 mm or less.

Suitably, the follower is configured to operate the catch arrangement by a first interaction portion on the follower being configured to engage with a second interaction portion on the catch arrangement, so that the engaging of the first and second interaction portion causes a movement of the follower to be transferred to the catch arrangement. Thereby, movement of the follower is transferred in an efficient and reliable way to the catch arrangement.

The catch arrangement of the locking device may comprise a catch and the follower arm may comprise a catch receiver that is configured to receive the catch. Also, the catch arrangement may be configured to operate the follower arm by a driving surface of the catch engaging with a contact surface delimiting the catch receiver, so that the engaging of the catch and the contact surface causes a movement of the catch arrangement to be transferred to the follower arm. Thereby, the movement of the catch arrangement along the movement path causes the transfer of motion to the follower arm so that the follower arm is able to rotate in an efficient way. It is highly advantageous that the rotation of the follower is transferred to the follower arm by the movement of the catch arrangement since this allows for a very compact locking device and a convenient and stable operation of the follower arm. The catch arrangement performs the double functions of operating the follower arm and blocking the follower arm, and this is achieved by the follower moving the catch arrangement along the movement path to the end where the driving surface of the catch is no longer able to contact the contact surface due to different movement paths of the follower arm and the catch arrangement so that the rotation of the follower arm and the movement of the catch arrangement cooperating to bring the catch at least partly out of the catch receiver. Once the follower arm has been rotated so that the driving surface is no longer aligned with the contact surface, the catch arrangement reaches the blocking state.

Suitably, the catch comprises a blocking surface that is configured to prevent rotation of the follower arm in the blocking state by the blocking surface contacting an edge of the catch receiver. Thereby, the catch is able to hinder the follower arm from moving when the catch arrangement is in the blocking state, since the edge of the catch receiver will be stopped by the blocking surface if a rotation of the follower arm is attempted by unauthorized manipulation of the locking device. Since the follower arm is configured to rotate whereas the catch arrangement is configured to move along a different path, the follower arm is not able to move the catch arrangement once the blocking state has been reached. This is because the force that may be applied to the blocking surface by the edge of the catch receiver is directed at an angle to the direction of movement of the catch arrangement.

Also, the blocking state may comprise a first blocking state at a first end of the movement path and a second blocking state at a second end of the movement path. Thereby, the catch arrangement is able to block the follower arm both at the end of a movement for retracting the locking bolt and at the end or a movement for extending the locking bolt.

Suitably, the catch arrangement is operatively connected to a non-mechanical activation unit that is configured to cause a movement of the catch arrangement along the movement path in response to a non-mechanical activation of the non-mechanical activation unit. Thereby, the locking device may be operated by a second activation caused by the non-mechanical activation unit and this enables operation of the catch arrangement both by the activation that rotates the follower and by the activation caused by the non-mechanical activation unit that is able to act on the catch arrangement directly. This is highly suitable in locking devices that have multiple ways of activation, such as a mechanical activation that typically takes place by a user inserting a key into a cylinder and turning (said cylinder then being operatively connected to the follower) and by a user activating a non-mechanical activation unit that may comprise a motor or an electromagnetic activation or similar. The latter typically takes place by activating a button or switch or by using a tag or other electronic control means that operates the non-mechanical activation unit remotely as is well known in the art.

Also, the catch arrangement may comprise a first member having the second interaction portion and a second member that is controlled by the non-mechanical activation unit, said second member being operatively connected in a connection to the first member such that a movement of the second member in a first direction is transferred to the first member, and wherein the catch arrangement further comprises a play in the connection such that a movement of the first member in the first direction is not transferred to the second member. Thereby, movement of the catch arrangement that is caused by activation and rotation of the follower is not transferred to the non-mechanical activation unit. This is especially beneficial since it protects the non-mechanical activation unit from being forced to move when not duly activated, and this prolongs the lifetime of the non-mechanical activation unit and prevents damage caused by repeated forced movements.

Also, the catch arrangement may further comprise biasing means configured to urge the catch arrangement towards the blocking state. This is beneficial in ensuring that the blocking state is reached when the movement along the movement path for operating the follower arm has taken place. Especially in locking devices having a mechanical activation, such as is caused by inserting and rotating a key in a cylinder that is operatively connected to the follower arrangement, the use of biasing means is advantageous in ensuring that the movement of the catch arrangement duly reaches the end of the movement path. The biasing means suitably comprise at least one spring that is configured to urge the catch arrangement towards an end position and that acts on the catch arrangement with a spring force in a direction of movement along the movement path. In some embodiments, the biasing means may comprise one biasing means for urging the catch arrangement towards an end position in one end of the movement path and another biasing means for urging the catch arrangement towards an end position in another end of the movement path in order to achieve this advantage both for the locked state and for the unlocked state of the locking device.

Suitably, the follower of the follower arrangement comprises a first follower portion on a first side of the locking device and a second follower portion on a second side of the locking device, and each of the first follower portion and second follower portion may comprise a first interaction portion that is configured to engage with the second interaction portion of the catch arrangement. Thereby, the locking device may be used with cylinders that enable rotation a full revolution (360°) and by providing one such follower portion on either side of the locking device, the locking device may be used by mechanical activation on either side of the locking device without affecting the follower portion on the other side of the locking device.

Also, at least part of the follower arrangement and the catch arrangement may be held in an inner housing of the locking device. This is advantageous in providing a further protection against unauthorized manipulation so that the catch arrangement especially may not be brought out of its blocking state by any other means than the activation of the locking device.

Suitably, the locking device is a narrow profile lock. Especially for narrow profile locks where the available space is severely limited, the locking device of the invention is highly suitable due to its compact design with the follower arrangement rotating on the same first axis and the catch arrangement being provided in connection with the follower arrangement so that intermediary components for transferring movements may be avoided.

Many additional benefits and advantages of the present invention will be readily understood by the skilled person in view of the detailed description below.

DRAWINGS

Figure 2A:
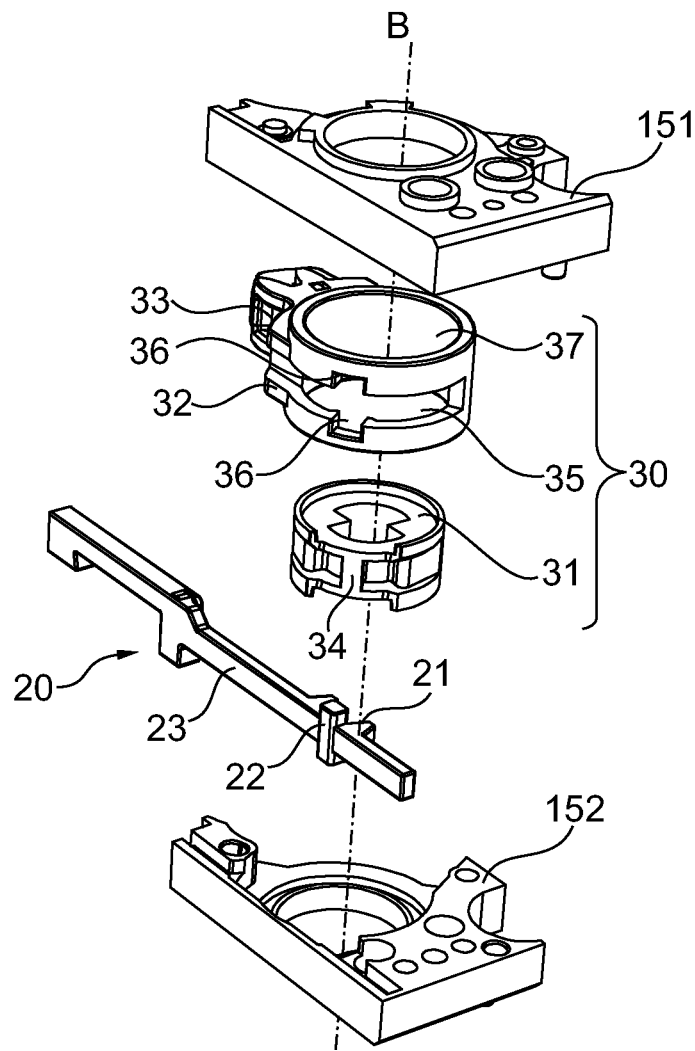
Figure 2B:
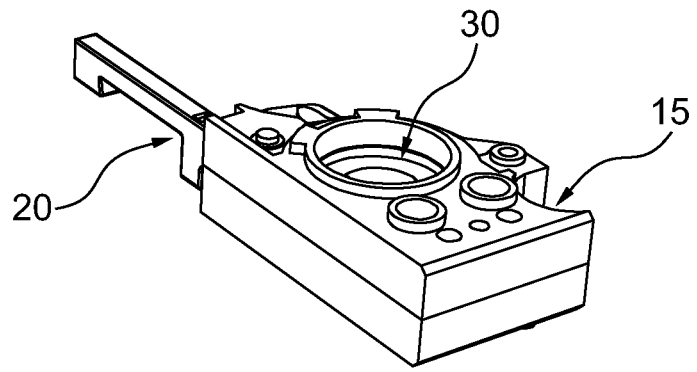
Figure 3A:
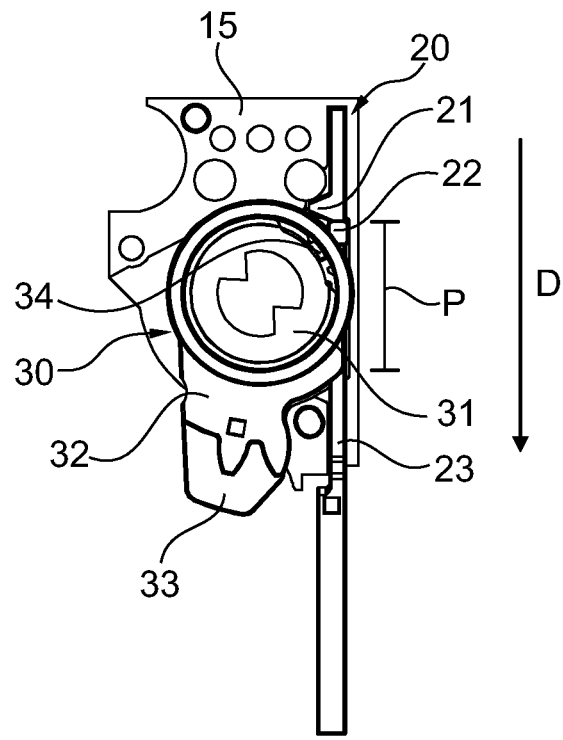
Figure 3B:
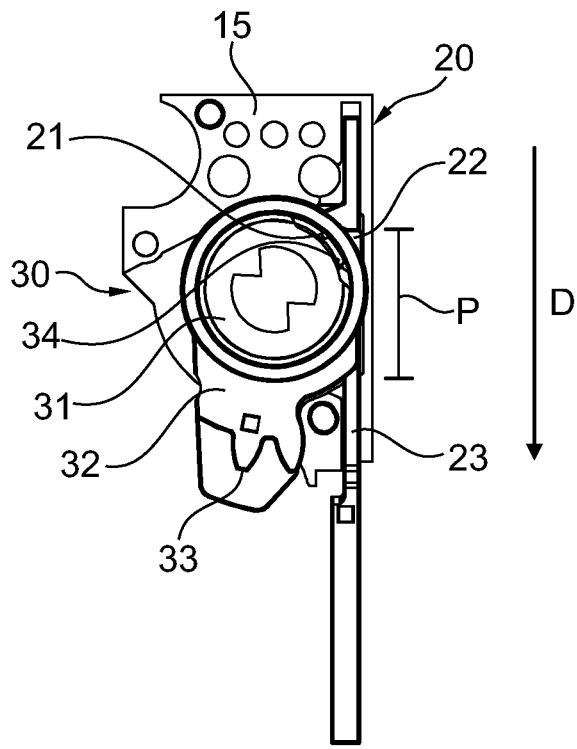
Figure 3C:
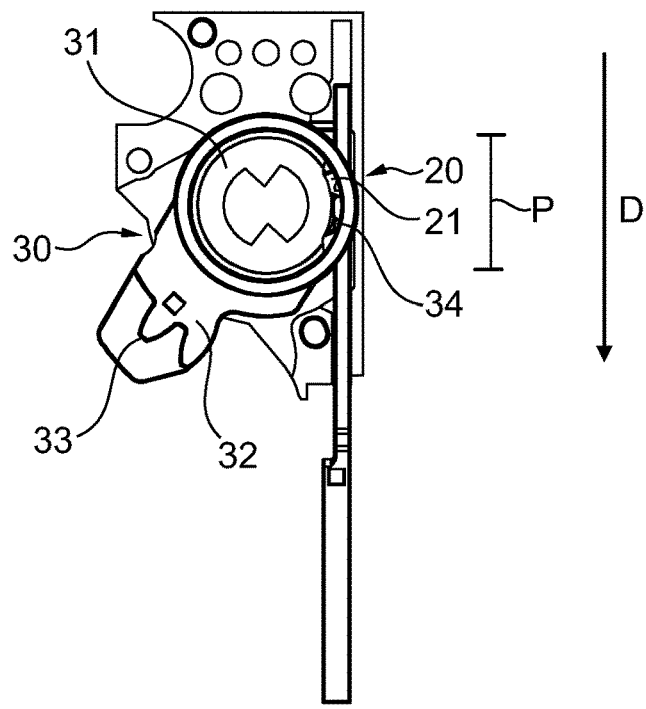
Figure 3D:
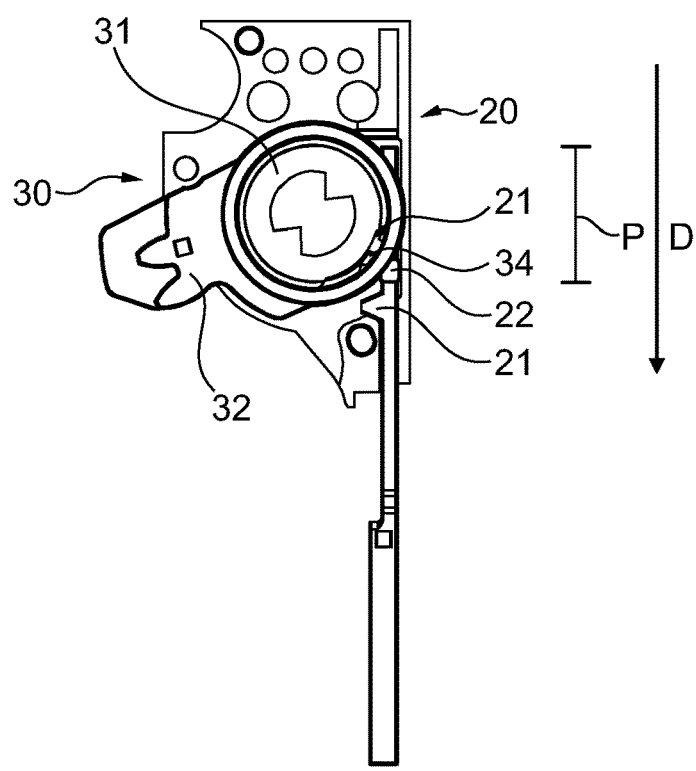
Figure 4A:
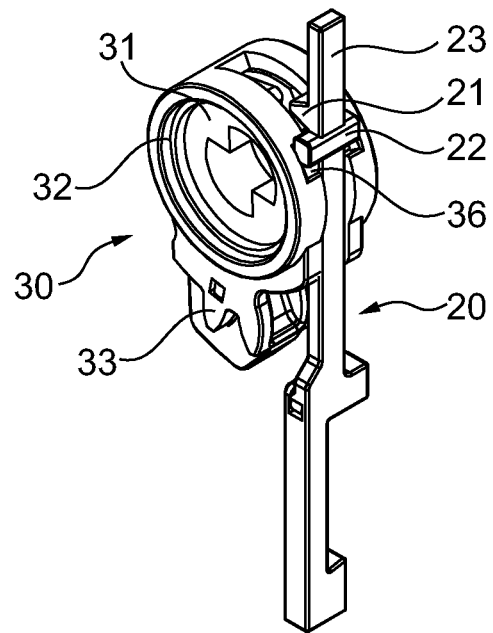
Figure 4B:
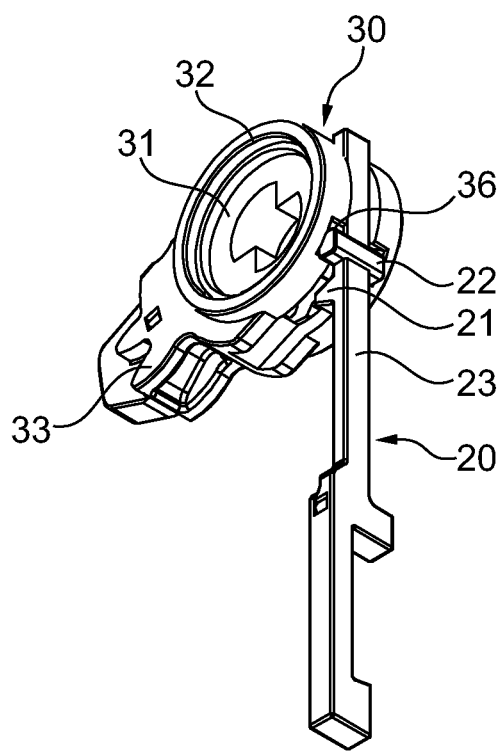
Figure 5:
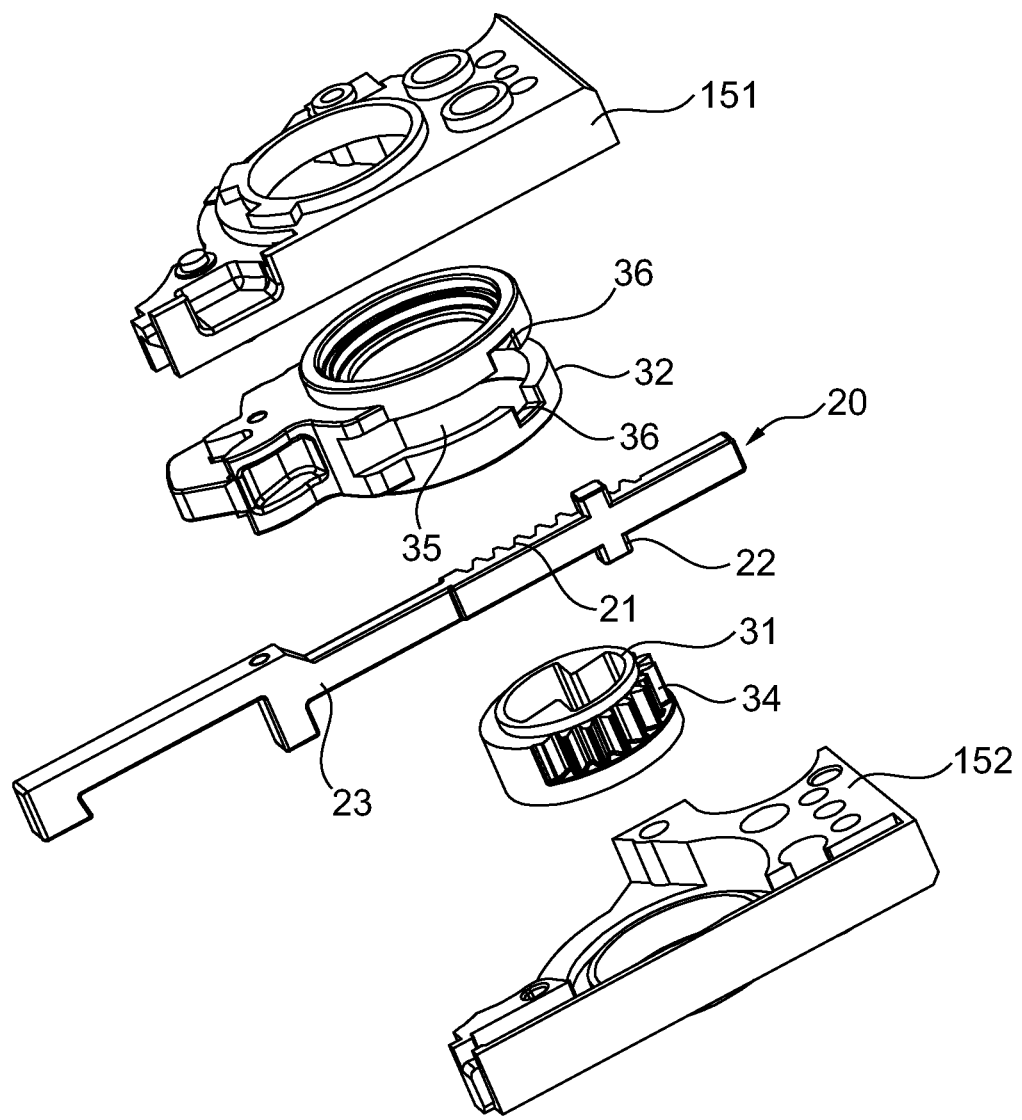
Figure 6E:
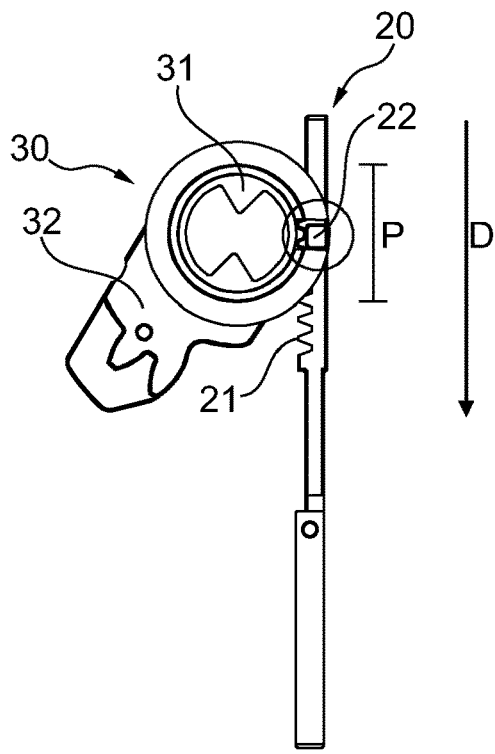
Figure 6F:
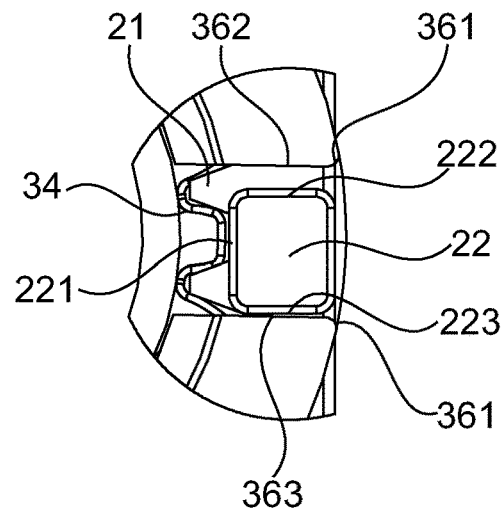
Figure 6G:
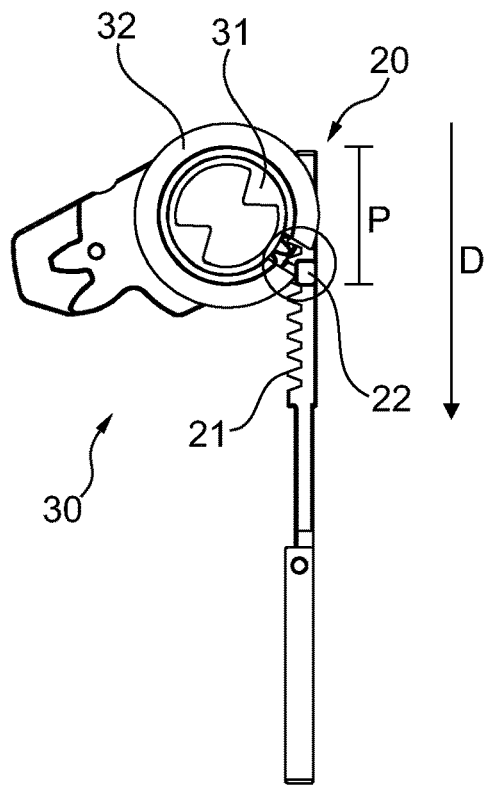
Figure 6H:
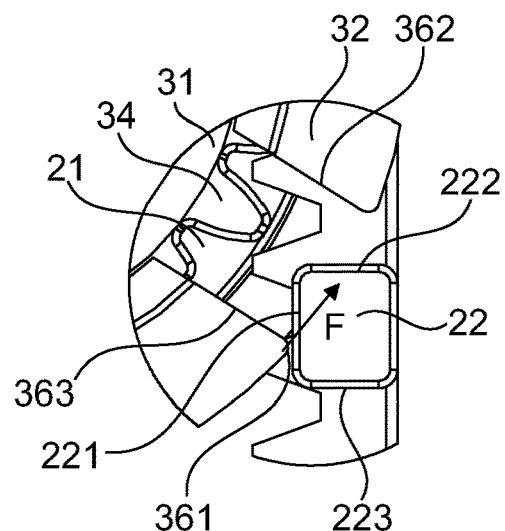
Figure 7A:
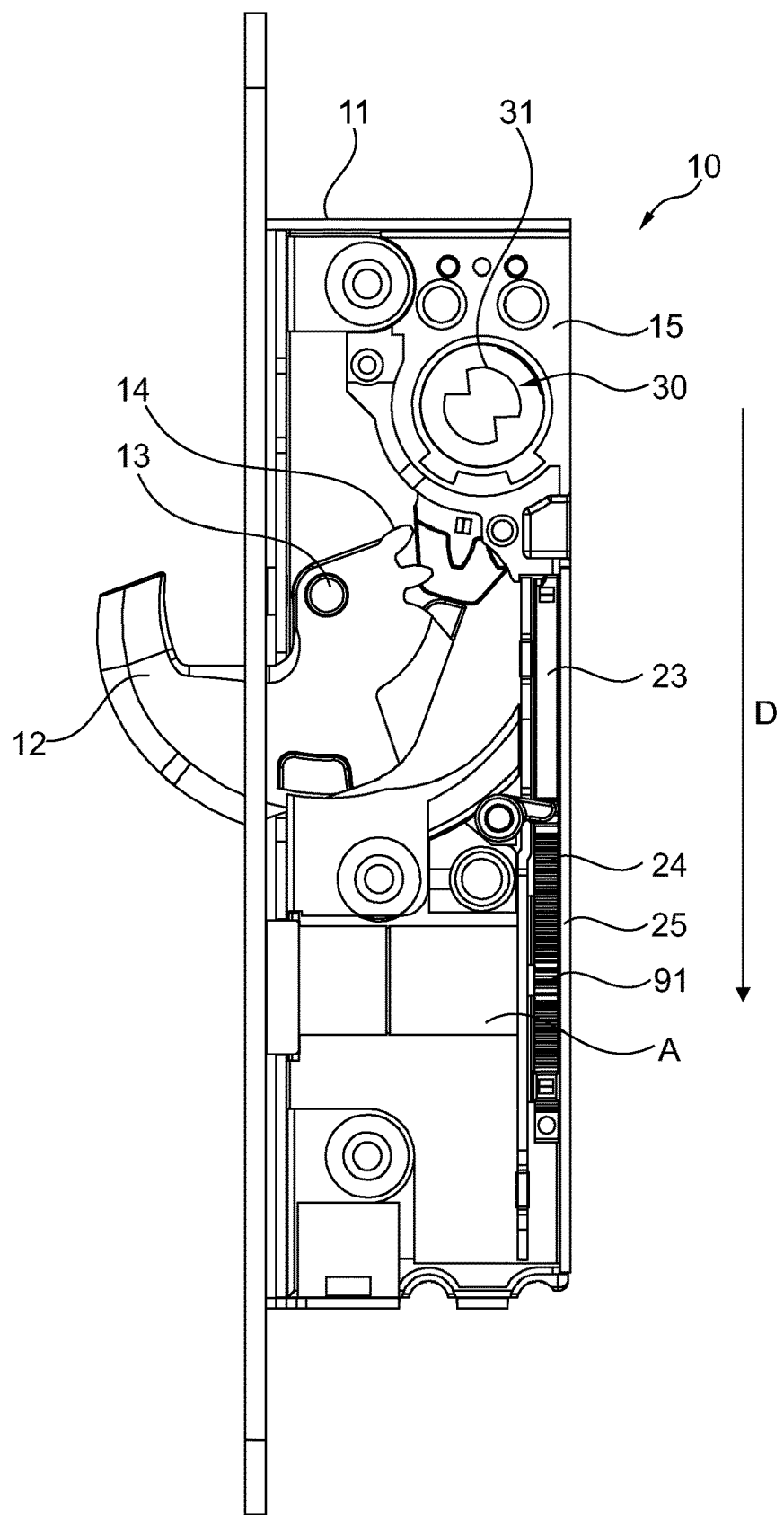
Figure 8A:
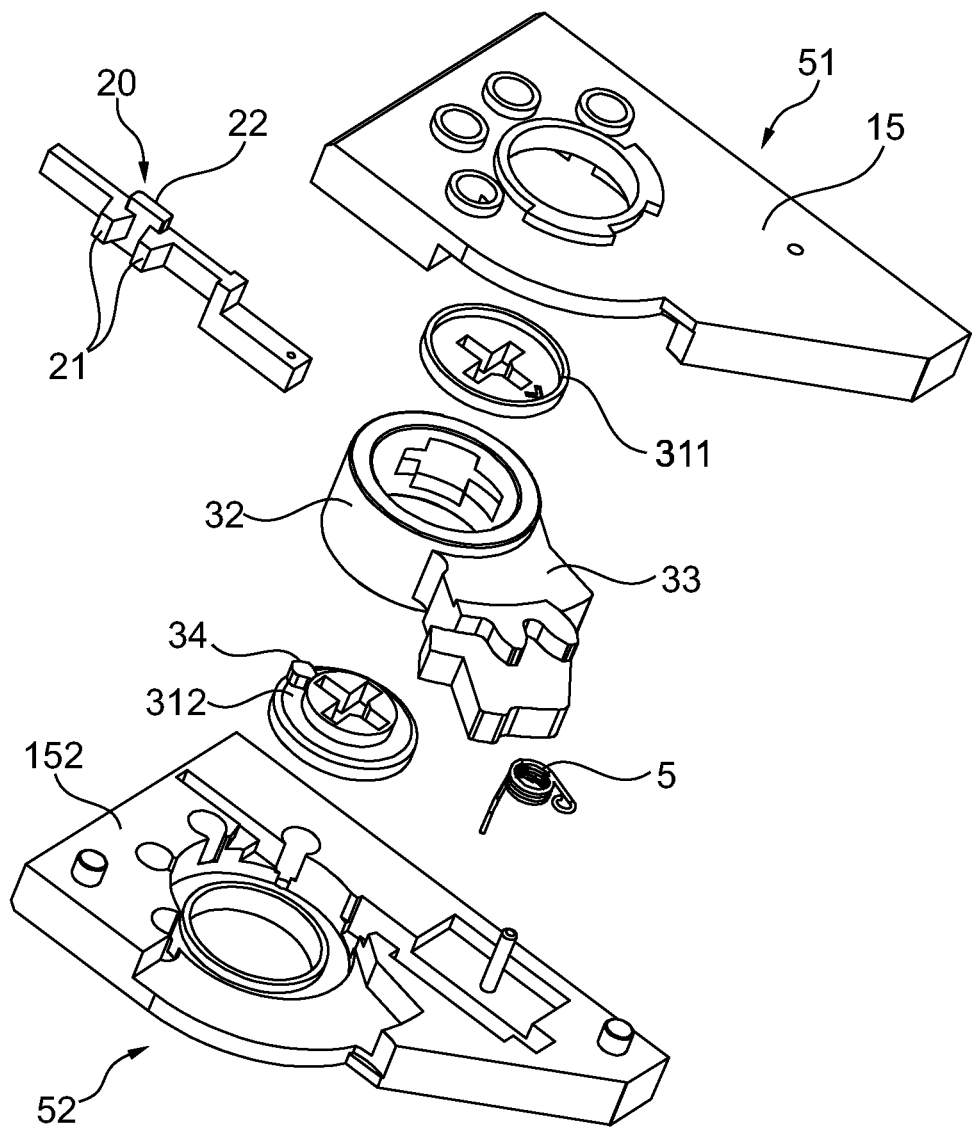
Figure 8B:
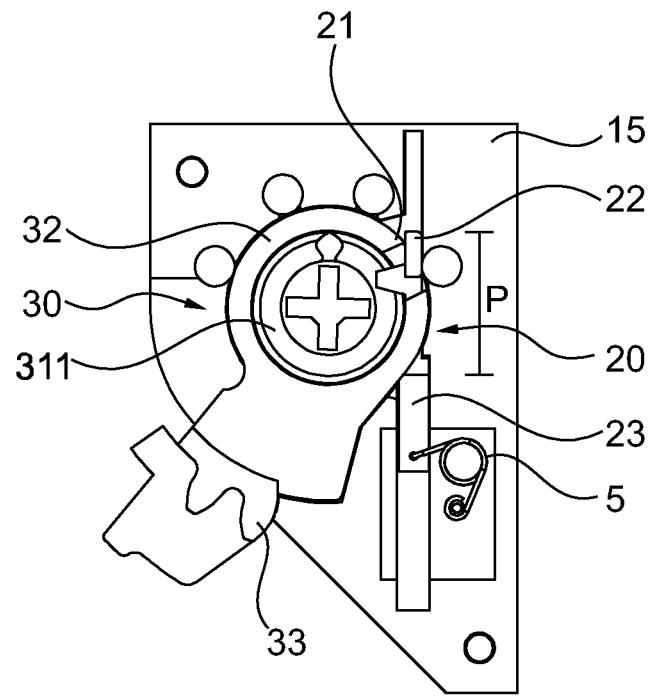
Figure 8C:
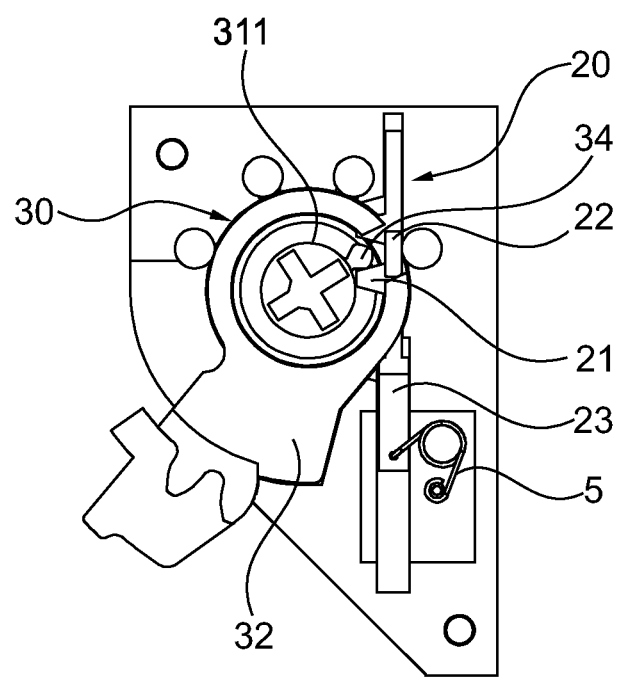
Figure 8D:
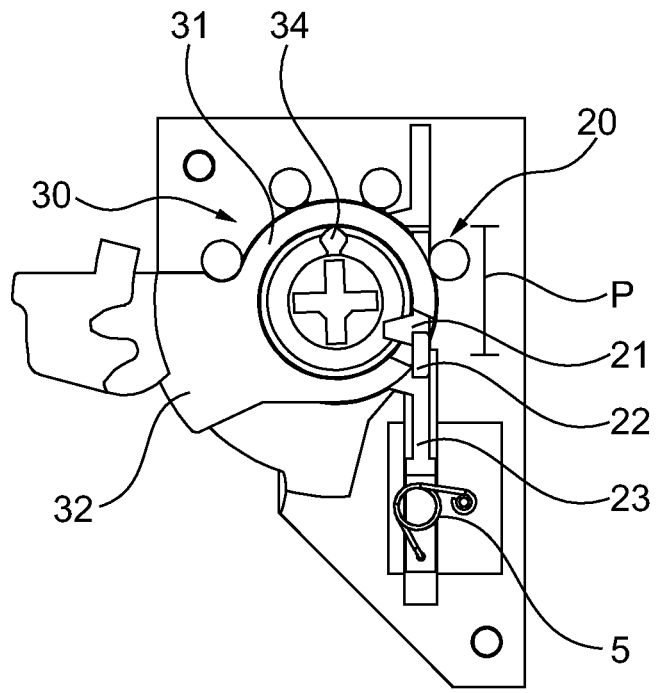
Figure 8E:
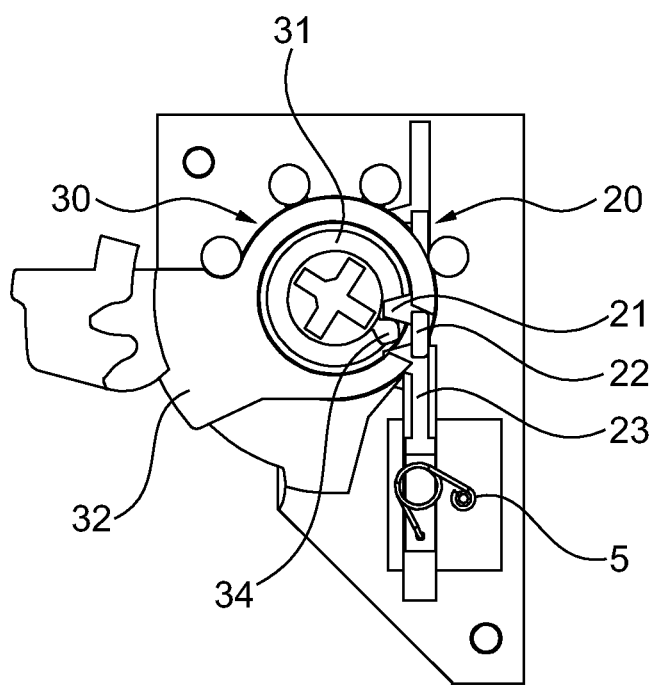

The invention will now be described in more detail with reference to the appended drawings, wherein FIG. 1 discloses a planar view of a locking device according to the invention;

FIG. 2*a* discloses an exploded view of a first embodiment of the locking device of the invention;

FIG. 2*b* discloses a perspective view of the first embodiment of FIG. 2*a*;

FIG. 3*a* discloses a planar view of the first embodiment in a locked state with the catch arrangement in a blocking state in a first end position of a movement path;

FIG. 3b discloses a planar view of the first embodiment with the catch arrangement in a first position along a movement path;

FIG. 3c discloses a planar view of the first embodiment with the catch arrangement in a second position along a movement patch;

FIG. 3d discloses a planar view of the first embodiment with the catch arrangement in a blocking state in a second end position of a movement path;

FIG. 4a discloses a perspective view of the first embodiment in the first end position;

FIG. 4b discloses a perspective view of the first embodiment in the second end position;

FIG. 5 discloses an exploded view of a second embodiment of the locking device of the invention;

FIG. 6a discloses a planar view of the second embodiment in the blocking state in the first end position of the movement path;

FIG. 6b discloses an enlarged view of the circle of FIG. 6a;

FIG. 6c discloses a planar view of the second embodiment in the first position along the movement path;

FIG. 6d discloses an enlarged view of the circle of FIG. 6c;

FIG. 6e discloses a planar view of the second embodiment in the second position along the movement path;

FIG. 6f discloses an enlarged view of the circle of FIG. 6e;

FIG. 6g discloses a planar view of the second embodiment in the blocked state in the second end position along the movement path;

FIG. 6h discloses an enlarged view of the circle of FIG. 6g;

FIG. 7a discloses a planar view of a third embodiment of the invention;

FIG. 7b discloses a perspective view of the third embodiment in the blocked state in the first end position along the movement path;

FIG. 7c discloses a perspective view of the third embodiment in the second position along the movement path;

FIG. 7d discloses a perspective view of the third embodiment in the blocked state in the second end position along the movement path;

FIG. 8a discloses an exploded view of a fourth embodiment of the invention;

FIG. 8b discloses a planar view from a first side of the fourth embodiment in the blocked state in the first end position along the movement path;

FIG. 8c discloses a planar view from a first side of the fourth embodiment in the first position along the movement path;

FIG. 8d discloses a planar view from a first side of the fourth embodiment in the blocked state in the second end position along the movement path; and FIG. 8e discloses a planar view from a first side of the fourth embodiment with the catch arrangement moved into a catch receiver of the follower arm from the second end position along the movement path.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

The locking device of the present invention will in the following be described in detail with reference to various embodiments. It is especially to be noted that features of one embodiment may be combined with features of another embodiment unless such a combination is particularly described as unsuitable. Parts of the invention that are similar or identical or that fulfil the same function are denoted by the same reference numerals throughout.

When the term "operatively connected" is used herein, this is to be understood as one component being able to transfer a movement to another component. Such transfer may take place directly by one component contacting the other component or it may alternatively take place by one or more intermediary components that are linked to each other so that the movement of one component is transferred to the other. As an example, a follower arm of the present invention as described below may be operatively connected to a locking bolt by the follower arm comprising a bolt contacting part that is brought into contact with the locking bolt as the follower arm moves in order to cause a corresponding movement of the locking bolt. Alternatively, the follower arm may contact an intermediary component that is moved directly by the follower arm and that in turn contacts the locking bolt and transfers the movement to the locking bolt. In some embodiments, the intermediary component may be a plurality of components that are able to act one on the other so that a movement of a first of the plurality of components is transferred.

FIG. 1 discloses a locking device 10 according to the invention having a locking bolt 12 that is pivotable on a bolt pivot 13 and that is able to interact with a follower arrangement 30 by a follower engagement part 14 being provided as is well known within the art. Thus, the follower arrangement 30 is operatively connected to the locking bolt 12, and in the embodiment shown in FIG. 1 this connection is achieved by a follower arm 32 (see FIG. 2a onwards below) being configured to contact the locking bolt 12. In other embodiments, the follower arm 32 may instead be connected to the locking bolt 12 through at least one intermediary component.

In FIG. 1 and indeed in most other Figures provided herein the locking bolt 12 is shown to be pivotable, but it is especially to be noted that the locking bolt 12 could also be a bolt that is able to perform a linear motion, such as a dead bolt or a latch bolt. Only minor modifications to the locking bolt 10 would be needed to adapt it to interacting with a linearly movable locking bolt 12 and this will not be described in detail herein; suffice it to say that it is well known within the field of locking devices that locking bolts may be pivotable or linear and that locking devices are easily modified to be used with one or the other.

The locking device 10 is fitted in a housing 11 that typically is of standard dimensions for the intended placement of the locking device 10 in a door. Dimensions of the housing generally differ depending on the intended placement and use of the locking device. For narrow profile locks, the housing 11 generally has a backset of about 35 mm or even as small as 28 mm. The locking device may also comprise an inner housing 15 for enclosing the follower arrangement 30 and a catch arrangement (see FIG. 2a onwards) at least partly in order to protect the locking device 10 from external manipulation.

The locking bolt 12 has an extended position shown in FIG. 1 that corresponds to a locked state, i.e. a state where the locking bolt 12 protrudes into a receiving portion in a door frame so that opening of a door that is equipped with the locking device 10 is prevented. The locking bolt 12 also has a retracted position corresponding to an unlocked state in which it is retracted into the housing 11 so that the door may move in relation to the door frame.

The locking device 10 of FIG. 1 comprises a follower 31 for activation of the locking device, and the follower arrangement 30 is configured to transfer a rotation of the follower 31 that occurs in response to the activation to the follower arm 32 for operating the locking bolt 12. An activation as used herein is to be understood as an operation of the locking device that is performed in order to extend or retract the locking bolt 12.

The activation of the follower 31 is suitably a mechanical activation in which a user inserts an object such as a key into a receiving component that is typically a cylinder (not shown). Said cylinder is mounted in connection with the follower 31 and typically comprises a protrusion that extends into an opening of the follower 31 such that the cylinder and the follower 31 are a able to rotate together. Such mechanical activation and variations thereof are well known within the art and are therefore not described in more detail herein. Alternatively, the activation may instead be a non-mechanical activation that acts to rotate the follower 31, suitably due to an electrical motor or an electromagnetic actuator or any other means that are known to be suitable for operating a locking device. For a non-mechanical activation, the user would typically cause the activation by bringing an authorization device such as a tag or keycard into a vicinity of the locking device or by pressing a button or similar that is operatively connected to a non-mechanical activation device arranged to interact with the follower 31. In response to the activation by the user, the non-mechanical activation device would then cause the rotation of the follower 31 by means of the electrical motor, the electromagnetic actuator, or similar. This is equally well known within the art and will not be described in more detail; suffice it to say that the activation of the follower 31 causes the follower 31 to rotate and in this way operates the locking device 10 as described herein.

FIG. 2a discloses a first embodiment of the invention in an exploded view, and FIG. 2b shows the same components mounted together. The inner housing 15 comprises a first housing part 151 and a second housing part 152 that are configured to enclose at least part of the follower arrangement 30 and the catch arrangement 20. The follower arrangement 30 in this embodiment comprises the follower 31 and the follower arm 32, and when mounted they are in this embodiment placed concentrically with the follower arm 32 surrounding the follower 31.

The follower arm 32 comprises a bolt engagement part 33 that is operatively connected to the locking bolt 12, either by being configured to contact the follower engagement part 14 directly or by contacting an intermediate component that in turn acts on the follower engagement part 14. In embodiments where a pivoting locking bolt 12 is used, it may be especially beneficial for the bolt engagement part 33 to be configured to contact the follower engagement part 14 directly since this allows for a compact design with few components and with an efficient transfer of force from the follower arm 32 to the locking bolt 12. However, in embodiments where a dead bolt or latch bolt is used it may instead be advantageous to provide one or more intermediary components to aid in transferring the rotary motion of the follower arm 32 into a linear motion for the locking bolt 12 since this increases efficiency of operation of the locking device 10 where a linear movement of the locking bolt 12 is desired.

The follower 31 further comprises a first interaction portion 34 that is configured to interact with a second interaction portion 21 of the catch arrangement 20 such that the rotation of the follower 31 is transferred to the catch arrangement 20. The first interaction portion 34 in this embodiment comprises a drive portion with a recess on either side in a rotational direction, and the second interaction portion 21 comprises two protrusions that are configured to enter the recesses so that the drive portion is held between the protrusions. As the follower 31 rotates in one direction, the drive portion contacts the protrusion provided in that direction and pushes against it so that the rotation is transferred to the catch arrangement 20, and as the follower 31 then rotates in an opposite direction, the drive portion instead contacts the other protrusion and pushes against it in order to cause a movement of the catch arrangement 20 in the opposite direction.

In order for the follower 31 to be able to contact the catch arrangement 20, the follower arm 32 comprises an opening 35. In connection with the opening 35 is also provided a catch receiver 36 that is suitably in the form of at least one recess into which a catch 22 of the catch arrangement 20 is able to fit. Said catch arrangement 20 comprises the second interaction portion 21 and the catch 22 that are arranged on a first member 23. In the mounted state shown in FIG. 2b the follower 31 and the follower arm 32 are arranged concentrically with the follower 31 inside a hollow 37 of the follower arm 32 such that they are both able to rotate around a first axis B. The catch arrangement 20 is mounted with the second interaction portion 21 able to engage with the first interaction portion 34 and with the catch 22 able to enter into the catch receiver 36.

Operation of the follower arrangement 30 and the catch arrangement 20 of the locking device 10 will now be described in more detail with reference to FIG. 3a-3d that show the first embodiment.

In FIG. 3a, the catch arrangement is in a blocking state in which the catch 22 prevents rotation of the follower arm 32. How this is achieved through interaction of the catch 22 with an edge of the catch receiver 36 will be shown in more detail below. In the blocking state, any attempts to manipulate the locking device such as by forcing a movement of the locking bolt 12 or by entering into the locking device to attempt to move components of the locking device 10 by unauthorized means are prevented by the catch 22 preventing rotation of the follower arm 32, which in turn blocks the locking bolt 12 and any intermediary components connected thereto from moving.

In FIG. 3b the catch arrangement 20 is in a first position where an activation of the follower 31 has occurred so that a rotation in a clockwise direction of the follower 31 commences. As seen in FIG. 3b, a position of the follower 31 differs only slightly from the position shown in FIG. 3a, but the catch arrangement 20 has started to move along a movement path P so that the catch 22 is no longer blocking the follower arm 32. The movement of the catch arrangement 20 is caused by the first interaction portion 34 engaging with the second interaction portion 21 so that the first member 23 is moved in a first direction D along the path P. This motion causes the catch 22 to leave an end position as shown in FIG. 3a and enter into the catch receiver 36 of the follower arm 32. Interaction of the catch 22 with the catch receiver 36 is described in more detail below with reference to FIG. 6a-6h.

FIG. 3c discloses the catch receiver in a second position where the follower 31 has been rotated further in the clockwise direction so that the catch arrangement 20 is moved along the movement path P. Through interaction of the catch 22 with the follower arm 32, the follower arm 32 is rotated in the clockwise direction so that the bolt engagement part 33 is able to act on the locking bolt 12 for retracting the locking bolt 12, either directly or through intermediate components. In FIG. 3*d* the rotation of the follower 31 is completed and the catch arrangement 20 has reached a second end position of the movement path P and entered into the blocking state again, in which the catch 22 is brought out of a driving engagement with the catch receiver 36 and again acts to block movement of the follower arm 32. In this blocking state, the rotation of the follower arm 32 is completed and this has caused the locking bolt 12 to reach its retracted position so that the locking device is in the unlocked state. In this position, further movements of the locking bolt 12 and the follower arm 32 are again prevented by the blocking of the catch 22.

In order for the locking device 10 to be brought from the unlocked state of FIG. 3*d* to the locked state shown in FIG. 3*a*, i.e. from the blocked state at the second end of the movement path P towards the blocked state at the first end of the movement path P, the follower 31 is again activated but now rotated counterclockwise so that the catch arrangement 20 is moved along the movement path P in an opposite direction to the first direction D. The catch 22 is brought from the blocking state into the driving position in relation to the catch receiver 36 where the follower arm 32 is rotated so that the locking bolt 12 is extended. Once the blocking state of FIG. 3*a* is reached, the locking bolt 12 and follower arm 32 are again prevented from moving.

Thus, the operation of the locking device 10 is in this embodiment controlled by the activation of the follower 31 that causes the rotation that is transferred to the catch arrangement 20. The catch 22 of the catch arrangement 20 in turn acts as a driver to operate the follower arm 32 and cause the rotation that is transferred to the locking bolt 12. By the follower 31 being operatively connected to the follower arm 32 via the catch arrangement 20, the follower 31 is able to both cause the movement of the follower arm 32 when the catch 22 is in a driving position inside the catch receiver 36 and to cause blocking of the follower arm 32 when the catch 22 reaches its end position and is brought out of the driving position to instead reach the blocking position. It is especially advantageous that the follower arm 32 moves along a rotary path around the first axis B whereas the catch arrangement 20 does not, since this means that a movement path of the follower arm 32 will align with the movement path P of the catch arrangement 20 along a part of the movement path P of the catch arrangement but that the catch 22 will be brought out of the catch receiver 36 at the end of the movement path P so that the blocking of the follower arm 32 may take place.

FIG. 4*a* and FIG. 4*b* show the components of FIG. 3*a*-3*d* in the first end position (corresponding to FIG. 3*a*) and the second end position (corresponding to FIG. 3*d*) of the movement path, i.e. in the two blocking positions.

As is more clearly shown in FIG. 4*a*-4*b*, the catch 22 may extend on either side of the first member 23 in a direction perpendicular to a direction of movement of the catch arrangement 20, so that the catch 22 fits into one catch receiver 36 on one side of the opening 35 and another catch receiver 36 on another side of the opening 35. This is advantageous in enabling a symmetrical transfer of force from the catch receiver 36 to the follower arm 32, but it is to be noted that the catch 22 could alternatively protrude on only one side of the first member 23. Also, the follower arrangement 30 and the catch arrangement 20 could optionally be configured to interact with each other in another way than through the follower 31 contacting the catch arrangement 20 through the opening 35 and the catch arrangement 20 contacting the follower arm 32 by means of catch receivers 36 in connection with that opening 35. One such other way could be with the follower 31 configured to contact the catch arrangement 20 on one side or both of the follower arm 32 in an axial direction in relation to the first axis B, and the catch arrangement 20 could in such an embodiment contact the follower arm 32 on one side of its connection with the follower 31. Other variations would also be possible within the scope of the invention, as long as the follower 31, the catch arrangement 20 and the follower arm 32 are able to interact with each other in the way described herein so that a movement of the follower 31 is transferred to the follower arm 32 via the catch arrangement 20 and so that the catch arrangement 20 is able to block the follower arm 32 from moving in the blocking state.

In some embodiments, the catch 22 may be arranged on the follower arm 32 and the catch receiver 36 on the catch arrangement 20.

It is to be noted that the locking device 10 of the invention may have only one blocking state that is to be found at one end of the movement path P of the catch arrangement 20. However, it is advantageous to be able to achieve the blocking state at both ends of the movement path P since this enables blocking the locking bolt 12 in both the extended and the retracted position. If only one blocking state is used, this may be selected at either of the first and the second end positions as shown in FIG. 3*a*-3*d* and FIG. 4*a*-4*b*, and in order to modify the locking device 10 so that only one blocking state is achieved the movement path P may for instance be shortened in the end of the movement path P where blocking is not desired so that the catch 22 is not brought out of the catch receiver 36 towards that end. This would leave the catch 22 in its drive position.

As described herein in connection with the first embodiment and some of the others, the catch arrangement 20 is configured to perform a linear movement along the movement path P, but it is to be noted that in some embodiments the catch arrangement 20 could instead be configured to move along a curved movement path P or a path of another shape. It is advantageous, however, that the movement path P of the catch arrangement 20 differs from a rotary movement path of the follower arm 32 so that the catch 22 is brought out of the catch receiver 36 into the blocking position towards at least one end of the movement path P of the catch arrangement 20, but as long as this is achieved the movement path P may have any suitable shape.

FIG. 5 shows a second embodiment of the invention that differs from the first embodiment mainly in the first interaction portion 34 and the second interaction portion 21 being geared portions that are configured to mesh in order to transfer a movement from the follower 31 to the catch arrangement 20. Geared portions have an advantage in being able to transfer a movement smoothly and to ensure a reliable and stable operation of the locking device 10. There are also advantages related to a more cost-efficient manufacture of the locking device 10 and to the ability to achieve a longer driving distance of the follower 31 and the catch arrangement 20 in relation to each other.

In FIG. 6*a*-6*h* the same positions as in FIG. 3*a*-3*d* are shown but enlarged views are also provided to show interaction of the catch arrangement 20 and the follower arrangement 30 more clearly. In the following, features and interaction that have previously been described will be mentioned only briefly and instead the enlarged views will be discussed in more detail.

FIG. 6a-6b shows the blocking position at the first end of the movement path P. In this position, the catch 22 is not inside the catch receiver 36 but instead is in the blocking position where a blocking surface 221 faces an edge 361 of the catch receiver 36. Any movement of the follower arm 32 in a clockwise direction will bring the edge 361 into contact with the blocking surface 221 and push against the blocking surface 221 with a force F as shown in FIG. 6b. Since the catch arrangement 20 is able to move along the movement path P but not in any other direction, this force F will not cause a movement of the catch arrangement 20 but instead the movement of the follower arm 32 will be prevented as long as the catch 22 is in the blocking position.

In FIG. 6c-6d the catch arrangement 20 is in the first position along the movement path P and the catch 22 is no longer in the blocking position. This means that the catch 22 is moved in the first direction D so that the edge 361 may no longer contact the blocking surface 221. Instead, the catch 22 is brought into the catch receiver 36 so that a drive surface 223 is able to contact a contact surface 363 of the catch receiver 36 in order to transfer the movement of the catch arrangement 20 from the catch 22 to the follower arm 32.

FIG. 6e-6f show the second position where the catch 22 rotates the follower arm 32 by the drive surface 223 of the catch 22 contacting the contact surface 363 and pushing against it so that the follower arm 32 moves together with the catch 22. As long as the catch 22 is in the catch receiver 36, movement of the catch arrangement 20 is transferred in this way and the catch 22 acts as a driver.

FIG. 6g-6h show the second end of the movement path P with the blocking state. This is similar to the first blocking state in that the movement of the catch 22 has brought it out of alignment with the catch receiver 36 so that the blocking surface 221 faces the edge 361 of the catch receiver 36. An attempt to rotate the follower arm 32 would cause a force F as shown in FIG. 6h and since this force is not able to move the catch arrangement 20 along the movement path P, the follower arm 32 is efficiently blocked.

When moving from the second end position of the movement path P to the first end position, the movement of the catch 22 along the movement path P is reversed so that a drive surface 222 opposite to the drive surface 223 that acted on the contact surface 363 during the movement from the first position to the second position instead acts on a contact surface 362 on an opposite side of the catch receiver 36. For sake of simplicity, both drive surfaces 223, 222 are referred to as the drive surface and both contact surfaces 362, 363 are referred to as the contact surface herein. These surfaces are similar or identical to each other apart from their orientation on the catch 22 and on borders of the catch receiver 36.

FIG. 7a discloses a third embodiment of the invention, showing the locking device 10 with the components shown in FIG. 1. The third embodiment differs from the first and second by the catch arrangement 20 being operatively connected to a non-mechanical activation unit A so that the locking device 10 may be operated either in the way described above by activation of the follower 31 or by activation of the non-mechanical activation unit A. The non-mechanical activation unit A may be electrical, electromagnetic, or any other kind of activation unit that is able to cause the catch arrangement 20 to move as described herein. In FIG. 7a, the non-mechanical activation unit A is shown as an electrical motor that is able to rotate a rotating portion 91 in response so an activation. The catch arrangement 20 comprises the first member 23 and also comprises a second member 24 that is configured to engage with the rotating portion 91 so that the rotation is transferred into a movement of the second member 24 in the first direction D.

FIG. 7b shows the catch arrangement 20 and the follower arrangement 30 with the catch 22 in the blocking state at the first end of the movement path P. By the non-mechanical activation unit A causing a movement of the second member 24 in the first direction, the second member 24 transfers this movement to the first member 23 so that the catch 22 is moved along the movement path P. In this way, the locking device 10 may be operated by the non-mechanical activation unit A and the movement of the catch arrangement 20 causes the same operation of the follower arm 32 as described above with reference to the first and second embodiments.

It is advantageous to be able to activate the locking device 10 both through a first activation of the follower 31 and through a second activation of the second member 24 of the catch arrangement 20, and this allows for two separate ways of controlling the locking device that are achieved in a very compact, robust and efficient way. Even though the locking device 10 of the third embodiment comprises these additional components (i.e. the non-mechanical activation unit A and the second member 24) it may still be used in locking devices where available space is severely limited, such as in narrow profile locks or in locks where multiple other components need to be fitted into the locking device 10. In embodiments where both the first and the second activation are available, the first activation is suitably a mechanical activation through a key or similar, whereas the second activation may be the motor or the electromagnetic actuator or similar.

As shown in FIG. 7b, the catch arrangement 20 suitably comprises a play C in a connection between the first member 23 and the second member 24. The play is formed by a clearance between two components so that one of them is able to move without engaging the other. This may be achieved in various ways but is in the third embodiment disclosed as a catch protrusion C1 of the second member 24 protruding into a play gap C2 in the first member 23. Of course, the catch protrusion C1 could just as well be on the first member 23 and the play gap C2 on the second member 24, and other ways of creating the play C may also be used as long as the function described herein is achieved. Thus, the play C is generally formed by a protrusion extending into a gap that is larger than the protrusion so that the protrusion and the gap are movable in relation to each other in at least one direction without engaging each other.

The purpose of the play C is to protect the non-mechanical activation unit A from being affected by the first activation through the follower 31. Since the follower 31 is connected to the catch arrangement 20 in such a way that the rotation of the follower 31 causes the movement of the first member 23 of the catch arrangement, the play C enables the first member 23 to move freely in the first direction D without causing a corresponding movement of the second member 24. At the same time, a movement in the first direction D of the second member 24 caused by the non-mechanical activation unit A is transferred to the first member 23 by the catch protrusion C1 contacting an edge of the play gap C2 so that the first member 23 is pulled in the first direction D. In FIG. 7b, the catch arrangement 20 is shown in a rest position in which both the first activation and the second activation of the locking device 10 are possible.

FIG. 7c shows the catch arrangement 20 activated by the first activation in which a rotation of the follower 31 takes place. The first member 23 is moved in the first direction D by this but the second member 24 remains in place unaffected by this. FIG. 7d shows the catch arrangement 20 in the second end position and the second member 24 is still unaffected by the movement of the first member 23.

The play C is formed by a catch protrusion C1 in a mounted state extending into a play gap C2 that has a length that allows the first member 23 to move in response to the rotation of the follower 31 without the catch protrusion C1 contacting edges of the play gap C2.

The non-mechanical activation unit A is suitably configured to maintain the second member 24 in the rest position of FIG. 7*b* when not activated by the non-mechanical activation unit A itself, and this rest position suitably corresponds to a position in which a first contact surface 25 of the catch protrusion C1 is held sufficiently close to a second contact surface 26 of the play gap C2 for the first contact surface 25 to be able to contact the second contact surface 26 when the second member 24 is moved in the first direction D. This causes the first member 23 to move in the first direction D together with the second member 24.

Simultaneously, the rest position of the second member 24 is suitably a position in which a third contact surface 27 is at a distance from a fourth contact surface 28 of the play gap P2 so that the first member 23 is able to move in the first direction D in response to the rotation of the follower 31 without the third contact surface 27 and the fourth contact surface 28 coming into contact with each other.

In the position shown in FIG. 7*d*, the return of the catch arrangement 20 along the movement path may take place through the first activation with the rotation of the follower 31, but is may also take place through the second activation with the non-mechanical activation unit A causing a movement of the second member 24 in a direction opposite to the first direction D so that the third contact surface 27 and the fourth contact surface 28 act to transfer this movement to the first member 23.

Suitably, the non-mechanical activation unit A is configured to return the second member 24 to the rest position after activation.

FIG. 8*a* discloses a fourth embodiment of the locking device 10, which differs from the embodiments described above in a biasing means 5 being provided and also in the follower 31 being in the form of a first follower portion 311 on a first side 51 of the locking device 10 and a second follower portion 312 on a second side 52 of the locking device 10. Each of the first follower portion 311 and the second follower portion 312 comprises the first interaction portion 34 so that they are each able to operate the catch arrangement 20 by contacting the second interaction portion 21. The first follower portion 311 and the second follower portion 312 are configured to rotate a full revolution in order to bring the catch arrangement 20 from the first end of the movement path P to the second end, or from the second end to the first.

The biasing means 5 suitable comprise a spring but may instead comprise any other known means for urging a component in a given direction. FIG. 8*b* shows the fourth embodiment mounted in the rest position of the blocked state with the catch 22 in the first end of the movement path P. The biasing means 5 are mounted in connection with the catch arrangement 20 in order to urge the first member 23 towards the blocked state. This is advantageous in making sure that the catch arrangement reaches the end of the movement path P so that the blocking of the follower arm 32 takes place, and ensures that the catch arrangement 20 is not unintentionally left in a position close to the blocking state but without actually blocking the follower arm 32. In some embodiments, the biasing means 5 may be provided to urge the catch arrangement 20 towards both the first blocking state and the second blocking state, but in other embodiments it may be used in one direction only. It is generally of a higher priority to ensure that a locking device 10 is securely held in the locked state, so if biasing means 5 are used to urge the catch arrangement 20 to only one of the blocking states it would generally be advantageous to ensure that the blocking state that corresponds to the locked state of the locking bolt is reached.

FIG. 8*c* shows the first position where the first follower portion 311 is rotated so that the first interaction portion 34 acts on the second interaction portion 21 and the catch arrangement 20 is brought from the blocking state into the driving position along the movement path P. The biasing means 5 preferably provides a biasing force that is small enough to allow the activation of the first follower portion 311 to take place as intended.

In FIG. 8*d*, the second end of the movement path P has been reached and the catch 22 is blocking rotation of the follower arm 32. The first follower portion 311 has been rotated a full revolution to its original position.

FIG. 8*e* shows a return of the catch arrangement 20 along the movement path P and discloses how the first follower portion 311 is rotated in a counterclockwise direction to achieve this.

In some embodiments, the first follower portion 311 and the second follower portion 312 may differ from each other so that one of them is e.g. a follower that is rotated a full revolution in order to extend or retract the locking bolt 12, whereas the other is a follower that is rotated only 90° to achieve this.

It is to be noted that features from the various embodiments described herein may freely be combined, unless it is explicitly stated that such a combination would be unsuitable.

The invention claimed is:

1. Locking device comprising:
a locking bolt (12) having an extended position corresponding to a locked state and a retracted position corresponding to an unlocked state,
a follower arrangement (30) comprising a follower arm (32) configured to rotate about a first axis (B), the follower arm (32) being operatively connected to the locking bolt (12) for moving the locking bolt (12) in response to rotation of the follower arm (32), and the follower arrangement (30) comprising a follower (31) configured to rotate about the first axis (B) in response to an activation, and
a catch arrangement (20) configured to block the follower arm (32) in blocking state to prevent rotation of the follower arm (32), wherein
the follower (31) is operatively connected to the catch arrangement (20) such that rotation of the follower (31) causes movement of the catch arrangement (20) along a movement path (P),
the blocking state corresponds to the catch arrangement (20) in an end position of the movement path (P), and
the catch arrangement (20) is configured to operate the follower arm (32) when not in the blocking state such that movement of the catch arrangement (20) along the movement path (P) causes movement of the follower arm (32),
the catch arrangement (20) is operatively connected to a non-mechanical activation unit (A) configured to cause movement of the catch arrangement (20) along the movement path (P) in response to non-mechanical activation of the non-mechanical activation unit (A), the catch arrangement (20) comprises a first member (23) having a second interaction portion (21) and a second member (24) operated by the non-mechanical activation unit (A), said second member (24) operatively connected to the first member (23) such that movement of the second member (24) in a first direction (D) is transferred to the first member (23), and the catch arrangement (20) comprises a play (P) formed by a clearance in the connection such that movement of the first member (23) in the first direction (D) is not transferred to the second member (24).

2. Locking device according to claim 1, wherein the follower (31) is operatively connected to the catch arrangement (20) by a first interaction portion (34) on the follower (31) configured to engage a second interaction portion (21) on the catch arrangement (20), such that engaging of the first and second interaction portion (34, 21) causes movement of the follower (31) to be transferred to the catch arrangement (20).

3. Locking device according to claim 2, wherein the catch arrangement (20) comprises a catch (22) and the follower arm (32) comprises a catch receiver (36) configured to receive the catch (32), and the catch arrangement (20) is configured to operate the follower arm (32) by a driving surface (222, 223) of the catch (22) engaging a contact surface (362, 363) delimiting the catch receiver (36), such that engaging of the driving surface (222, 223) and the contact surface (362, 363) causes movement of the catch arrangement (20) to be transferred to the follower arm (32).

4. Locking device according to claim 3, wherein the catch (22) comprises a blocking surface (221) configured to prevent rotation of the follower arm (32) in the blocking state by the blocking surface (221) contacting an edge (361) of the catch receiver (36).

5. Locking device according to claim 4, wherein the blocking state comprises a first blocking state at a first end of the movement path (P) and a second blocking state at a second end of the movement path.

6. Locking device according to claim 5, wherein the catch arrangement (20) is operatively connected to a non-mechanical activation unit (A) configured to cause movement of the catch arrangement (20) along the movement path (P) in response to non-mechanical activation of the non-mechanical activation unit (A).

7. Locking device according to claim 3, wherein the blocking state comprises a first blocking state at a first end of the movement path (P) and a second blocking state at a second end of the movement path.

8. Locking device according to claim 7, wherein the catch arrangement (20) is operatively connected to a non-mechanical activation unit (A) configured to cause movement of the catch arrangement (20) along the movement path (P) in response to non-mechanical activation of the non-mechanical activation unit (A).

9. Locking device according to claim 2, wherein the blocking state comprises a first blocking state at a first end of the movement path (P) and a second blocking state at a second end of the movement path.

10. Locking device according to claim 1, wherein the catch arrangement (20) comprises a catch (22) and the follower arm (32) comprises a catch receiver (36) configured to receive the catch (32), and the catch arrangement (20) is configured to operate the follower arm (32) by a driving surface (222, 223) of the catch (22) engaging a contact surface (362, 363) delimiting the catch receiver (36), such that engaging of the driving surface (222, 223) and the contact surface (362, 363) causes movement of the catch arrangement (20) to be transferred to the follower arm (32).

11. Locking device according to claim 10, wherein the catch (22) comprises a blocking surface (221) configured to prevent rotation of the follower arm (32) in the blocking state by the blocking surface (221) contacting an edge (361) of the catch receiver (36).

12. Locking device according to claim 11, wherein the blocking state comprises a first blocking state at a first end of the movement path (P) and a second blocking state at a second end of the movement path.

13. Locking device according to claim 10, wherein the blocking state comprises a first blocking state at a first end of the movement path (P) and a second blocking state at a second end of the movement path.

14. Locking device according to claim 1, wherein the catch arrangement (20) comprises biasing means (5) configured to urge the catch arrangement (20) towards the blocking state, said biasing means (5) preferably comprising a spring.

15. Locking device according to claim 1, wherein the follower (31) of the follower arrangement (30) comprises a first follower portion (311) on a first side of the locking device (10) and a second follower portion (312) on a second side of the locking device (10), and each of the first follower portion (311) and second follower portion (312) comprises a first interaction portion (34) configured to engage the second interaction portion (21) of the catch arrangement (20).

16. Locking device according to claim 1, wherein the follower arrangement (30) and the catch arrangement (20) are at least partly held within an inner housing (15) of the locking device (10).

17. Locking device according to claim 1, wherein the locking device (10) is a narrow profile lock.

18. Locking device comprising:
a locking bolt (12) having an extended position corresponding to a locked state and a retracted position corresponding to an unlocked state,
a follower arrangement (30) comprising a follower arm (32) configured to rotate about a first axis (B), the follower arm (32) being operatively connected to the locking bolt (12) for moving the locking bolt (12) in response to rotation of the follower arm (32), and the follower arrangement (30) comprising a follower (31) configured to rotate about the first axis (B) in response to an activation, and
a catch arrangement (20) configured to block the follower arm (32) in blocking state to prevent rotation of the follower arm (32), wherein
the follower (31) is operatively connected to the catch arrangement (20) such that rotation of the follower (31) causes movement of the catch arrangement (20) along a movement path (P),
the blocking state corresponds to the catch arrangement (20) in an end position of the movement path (P), and
the catch arrangement (20) is configured to operate the follower arm (32) when not in the blocking state such that movement of the catch arrangement (20) along the movement path (P) causes movement of the follower arm (32),
wherein the blocking state comprises a first blocking state at a first end of the movement path (P) and a second blocking state at a second end of the movement path.

* * * * *